United States Patent [19]
Winkelhake et al.

[11] Patent Number: 5,915,778
[45] Date of Patent: Jun. 29, 1999

[54] VEHICLE SEAT WITH A FLOOR TRACK ASSEMBLY

[75] Inventors: Bernd Winkelhake, Rinteln; Manfred Granzow, Dörentrup, both of Germany

[73] Assignee: Gebr. Isringhausen GmbH & Co. KG, Germany

[21] Appl. No.: 08/845,642

[22] Filed: Apr. 25, 1997

[30]   Foreign Application Priority Data

Apr. 26, 1996  [DE]  Germany ............................ 196 17 935

[51] Int. Cl.⁶ ...................................................... B60N 2/12
[52] U.S. Cl. .................................... 296/65.05; 296/65.13; 296/65.01; 248/430
[58] Field of Search ............................. 296/65.01, 65.05, 296/65.13, 65.14, 65.15; 248/429, 430

[56]         References Cited

U.S. PATENT DOCUMENTS 5,275,370   1/1994   Terai ................................ 296/65.13 X
5,641,146   6/1997   Hoshihara et al. ...................... 248/430

FOREIGN PATENT DOCUMENTS 3623007   1/1988   Germany ................................ 248/429

*Primary Examiner*—D. Glenn Dayoan
*Assistant Examiner*—Jason Morrow
*Attorney, Agent, or Firm*—Salter & Michaelson

[57]           ABSTRACT

The invention pertains to a vehicle seat with a floor track assembly which makes it possible to change the number and/or the seating arrangement in a passenger compartment by displacing the seats on the floor tracks. It is proposed that a situation be achieved via a combination of a defined track profile and an arrestment mechanism whereby the displacement of the seats on the tracks can be smoothly carried out with large tolerances in a manner which is insensitive to dirt and whereby complete freedom from play and rattling of the seat assembly is nevertheless ensured in the arrested state.

13 Claims, 2 Drawing Sheets

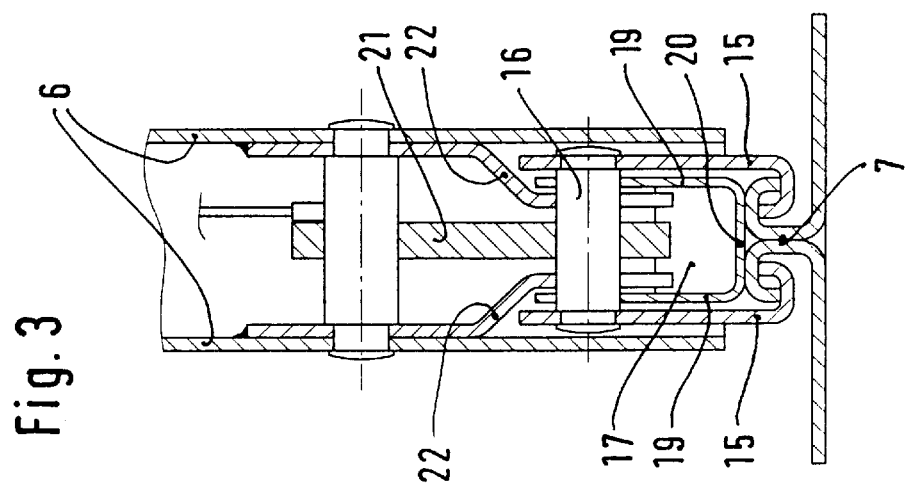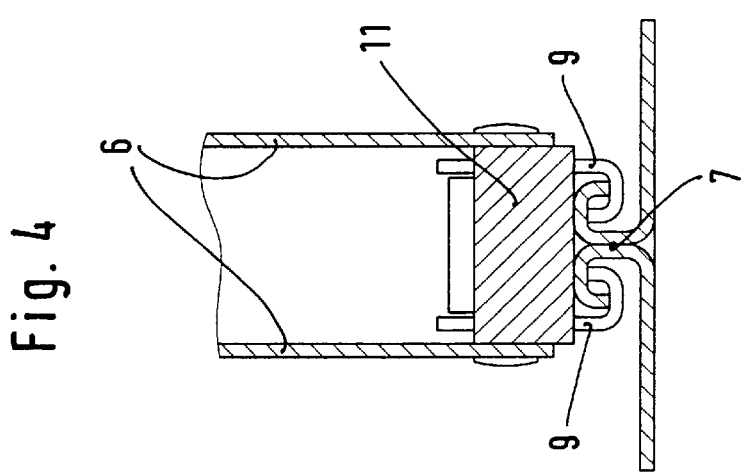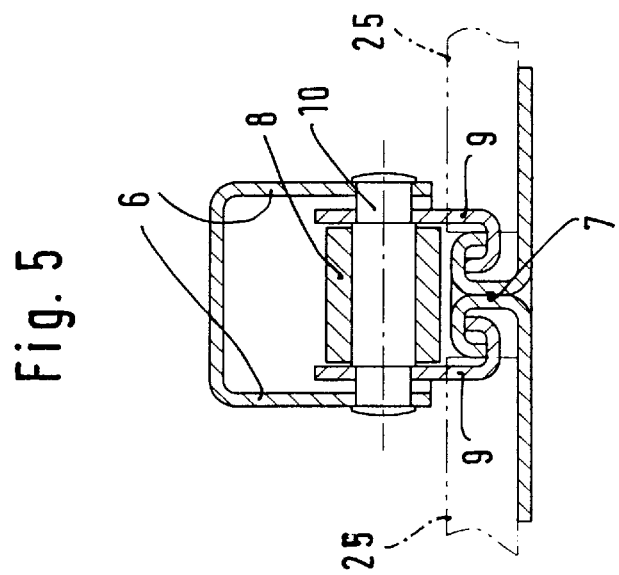

VEHICLE SEAT WITH A FLOOR TRACK ASSEMBLY

BACKGROUND AND SUMMARY OF THE INVENTION

The invention pertains to a vehicle seat, with a floor track assembly, in the passenger compartment (luggage compartment) of a vehicle.

In the case of vehicles with a passenger compartment and/or a luggage compartment, which is optionally capable of being equipped with vehicle seats in a varying number and/or sequential arrangement depending on requirements, or which is optionally capable of being switched from personnel conveyance to freight conveyance, the vehicle seat (e.g., in the form of bench seats) forms a closed (unitary) system together with its floor track assembly.

In the case of vehicle seats with a floor track assembly, it is known that one can provide at least two floor tracks which are arranged parallel to one another and which are attached to the floor of the vehicle. Such floor tracks are constructed in the form of U-shaped tracks for sliding or rolling purposes which are open at the top and in which the profile edges are retracted somewhat toward the inside so that the lateral supports of the frame of the vehicle seat are capable of being displaced longitudinally in the floor tracks by means of sliders or rollers and are capable of being arrested in selectable positions along the floor track. Arrestment usually takes place by means of wedging screws or plug-in bolts which are wedged in the U-shaped floor track or which are inserted into pre-punched holes.

A disadvantageous feature with such systems, especially in the case of personnel conveyance, is that the floor tracks, which are open at the top, have to be covered over (e.g. by means of a carpet) in order that they shall not cause passengers to stumble or that narrower shoe heels cannot get lodged in them. From a technical standpoint, covering of the floor tracks is also desired in order to avoid dirt on the running surfaces of the tracks which operate with relatively narrow guidance tolerances for the precise sliding or rolling type of guidance of the vehicle seats since, in this regard, complete freedom from play and rattling is required of the floor track attachment and one must also maintain the situation in which, despite the narrow tolerances, switching of the seat arrangement, i.e., exchanging and/or displacing the seats in the floor tracks, always has to be possible in a smooth manner.

The task of the present invention is to propose vehicle seats with a floor track assembly which, without expensive precision guidance, are nevertheless free from play and rattling and which are largely insensitive to dirt or dangers which arise from them in the event of conveying persons.

In accordance with the invention, this task is accomplished by means of the feature that the floor tracks have a T-shaped cross-sectional profile whose upper covering surface is closed and which is essentially aligned in a plane-parallel manner relative to the floor of the vehicle and that the lateral supports of the seat each have tensile anchors which preferably grip, from below, the two sides of the T-profile of the floor tracks, whereby, for the purpose of the arrestment of the vehicle seat, the lateral supports are squeezed off from the floor tracks via the tensile anchors by means of a lever mechanism in such a way that the tensile anchors are placed under tension against the underside of the T-profile of the floor tracks in a tight or firm manner.

It is initially a general advantage that the proposed T-shaped floor tracks can be constructed in a very flat manner, i.e., they require only a very small height for the assembly above the floor of the vehicle since (depending on the thickness of the material) they are gripped, from below, only by the relative flat tensile anchors of the lateral supports of the seat and the other guidance devices of the lateral supports (such as, for example, the slides or rollers) run only on the upper covering surface of the floor tracks.

The flatly constructed T-profiles of the floor tracks are merely sufficiently high in one practical form of embodiment that they do not tower above the carpet (or other floor covering) which is laid up to the floor tracks on both sides. No risk of stumbling arises from them.

The upper, closed covering surface of the T-profile also ensures that the floor tracks become less dirty and that narrower heels of shoes basically cannot get lodged in the floor tracks. Additional covering over of the floor tracks is not required.

The concept of squeezing off the lateral supports of the seat from the floor tracks (via the tensile anchors which grip the T-shaped floor tracks underneath) by means of a lever mechanism for the purpose of arresting the seat makes it possible—in every arrestment position of the seat—to achieve play-free and rattle-free attachment of the seat to the floor tracks without these having to be constructed in the form of precision guides. This considerably reduces the cost of the floor track assembly because the sliders or rollers, which run on the upper covering surface of the floor tracks, do not require exact guidance on the floor tracks solely for the purpose of displacement. A track guide which is constructed with a large tolerance is sufficient in order to displace the seats, whereby the track guide is associated with larger play and correspondingly more rattling noises but it is, and remains, correspondingly smoother for this purpose. It is only in the arrested state of the seat, i.e. in the state which is used for the conveyance of persons, that the attachment of the seat has to be play-free and rattle-free. This is ensured in the case of the seat in accordance with the invention and its floor track assembly.

The aforementioned large tolerances, which permit the guidance of the seats by the tracks without malfunctions arising in the seat assembly and/or while switching the seat arrangements, also have the advantage that the new system can follow, in an improved manner, the unevenness of the floor of the vehicle to which the floor tracks are attached.

The lever mechanism for squeezing off the lateral supports from the floor tracks in the desired arrestment position via the tensile anchors in each case is preferably carried out as follows in the manner described below.

A running roller is provided in the front region of the lateral supports in each case, whereby the running roller rolls along the covering surface of the T-profile of the floor track on displacing the seat and whereby the lever mechanism is provided by the lateral support itself, which is raised in the rear region on displacing the seat of the vehicle, as a result of which the front region of the lateral support is supported exclusively on the front roller and it is pressed down via its rear region for the purpose of arrestment of the vehicle seat, as a result of which a wedging component, which is attached to the lateral support and which is positioned in the vicinity of the front running roller between the lateral support and the floor track, is firmly wedged against the upper covering surface of the T-profile of the floor track. Such a lever mechanism has a very large leverage so that one obtains a very high wedging force from the wedging component against the floor track. The wedging force is taken up by the tensile anchor in each case which grips the T-profile of the floor track underneath.

The pressed down rear part of the lateral support is arrested via the T-profile by means of a releasable arrestment hook. Such direct arrestment of the rear part of the lateral support on the floor track is possible since arrestment occurs only in the arrestment state of the seat and, in its arrestment state, the seat is no longer displaced on the floor track.

In the case of the aforementioned form of embodiment of the invention, on the other hand, the rear part of the lateral supports (i.e. the rear part of the seat) must be manually supported in the raised state during displacement on the floor track since, in this form of embodiment, the rear region of the lateral supports does not have any rollers or sliding components etc.

A further improved form of embodiment of the invention provides the situation in which the rear regions of the lateral supports each have a rolling or sliding carriage that supports this region of the lateral supports both in the raised state and in the pressed down state. For this purpose, a rod-type supporting frame or a spring with compressed gas which is capable of expanding, can be arranged e.g., between the rolling or sliding carriage and the rear region of the lateral supports, whereby the rear part of the lateral support is supported on this frame or spring in the raised state.

In the pressed down state, the rear region of the lateral supports has to be arrested via the rolling and sliding carriage in a manner which is resistant to tensile and compressive forces. In order that this can constantly take place in a functionally reliable manner, the provision is made that the rolling or sliding carriage is connected to the rear region of the lateral support by means of a guiding lever in such a way that, on pressing down the rear region of the lateral support, a pressure component of the guiding lever travels under a pressure bearing on the carriage and pushes the carriage upward from the floor track so that the assigned tensile anchor(s) is/are placed under tension against the underside of the T-profile of the floor track.

DESCRIPTION OF THE DRAWINGS

An example of an embodiment of the invention will be described in more detail below on the basis of the drawings. The following aspects are shown.

FIGS. 3, 4 and 5 show cross sections through the lateral supports in accordance with FIGS. 1 and 2 along the sectional lines A—A, B—B and C—C, respectively.

DESCRIPTION OF THE PREFERRED EMBODIMENT

Figure 1:
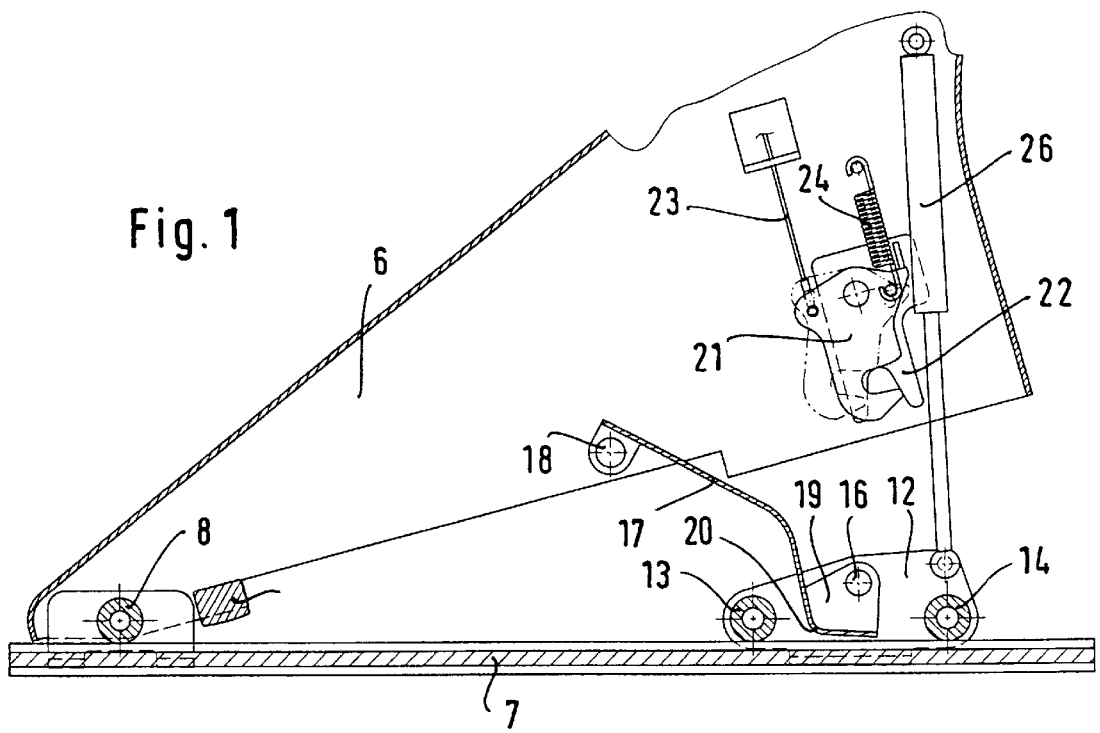
FIGS. 1 and 2 show a lateral view of the lateral support of a vehicle seat in the state in which it is capable of being displaced (FIG. 1) and in the arrested state (FIG. 2)

In the form of a simplified illustration, FIG. 1 shows a lateral support 6 of a vehicle seat and a floor track 7 which has a T-shaped profile in its cross section as can be seen from FIGS. 3 through 5.

In the front region of the lateral support 6 and in the raised (de-arrested) state of the lateral support, a roller 8 runs on the covering surface of the floor track 7. The T-profile of the floor track is gripped from below on both sides by a pair of tensile anchors 9 as is shown in FIG. 5. The tensile anchors are attached to an axis 10 of the running roller 8. The axis 10 is mounted on bearings in the lateral support 6.

A wedging component 11, e.g., an elastic block of rubber, is positioned near the front running roller 8 between the lateral support 6 and the floor track 7, whereby, as soon as the rear part of the lateral support is pressed down, the block of rubber is firmly wedged against the covering surface of the floor track 7. In this regard, see FIG. 2 and the cross sections in accordance with FIGS. 4 and 5. FIG. 4 shows the wedging component 11 which is firmly wedged against the covering surface of the floor track, as a result of which the tensile anchors 9 are firmly placed under tension against the underside of the T-profile of the floor track 7. In this state, the running roller 8 is raised from the covering surface of the floor track (see the cross section in accordance with FIG. 5).

A rolling carriage 12 with two running rollers 13 and 14 are located in the rear region of the lateral support. In turn, the rolling carriage has two tensile anchors 15 which grip the T-profile of the floor track 7 from below and from each side (see FIG. 3), whereby the tensile anchors are firmly connected to the axes of the running rollers 13, 14 and/or to a guiding axis 16 or, as the case may be, they are mounted in a tension-resistant manner on these axes.

A guiding lever 17 is simultaneously connected to the carriage 12 by means of the guidance axis 16, whereby the other end of the lever is connected to the lateral support 6 via the guidance axis 16. In this way, the rolling carriage 12 is always assigned positionally to the lateral support 6 even though the rear part of the lateral support 6 is raised (see FIG. 1) and the lateral support is displaced along the floor track 7.

In the raised state, the rear part of the lateral support is supported by a spring 26 with compressed gas so that manual support of the rear part of the seat can be dispensed with during displacement on the floor track.

Figure 2:
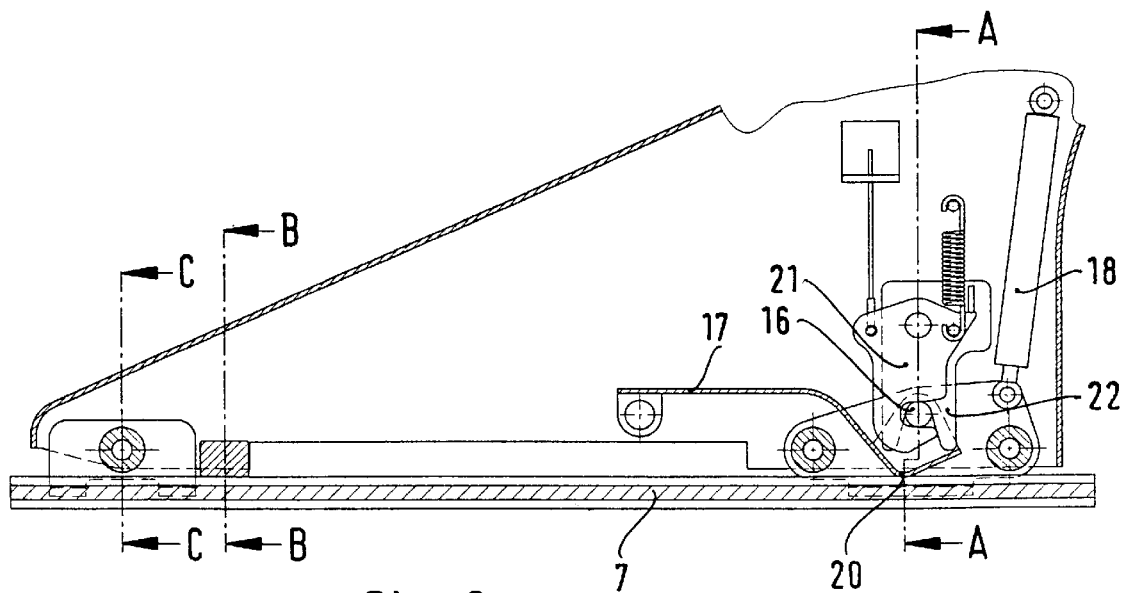

The aforementioned guidance lever 17 has the special feature that, as a result of appropriate shaping and as a result of lateral plates 19, it has a pressure component 20 which, on pressing down the rear region of the lateral support 6, travels under a pressure bearing (in this case, the guidance axis 16) and squeezes the carriage 12 upward from the floor track 7 so that the assigned tensile anchors 15 are placed under tension against the underside of the T-profile of the floor track (in this regard, see FIGS. 2 and 3).

The guidance axis 16 simultaneously serves as a take-up bolt for a take-up hook 21 which is mounted in the rear part of the lateral support 6 and provides arrestment via the take up bolt (guidance axis 16) on pressing down the rear part. In order that this shall take place in a problem-free manner, a V-shaped adjustment component 22 is attached to the insides of the lateral supports 6 in each case which, on pressing down the rear part of the lateral support 6, grip the guidance axis 16 from the top and carry out adjustment in regard to the take-up hooks.

The take-up hooks 21 can released against the closure force of the tensile spring 24 by means of a Bowden cable 23.

In cross sectional form, FIG. 5 shows the advantageous way in which a T-shaped floor track can be moved on the foor of a vehicle with a carpet. The carpet, which is indicated by the dotted/dashed lines 25, can be joined to the T-profile on both sides so that the floor tracks are arranged in a sunken manner and are virtually flush with the floor covering (carpet). As a result of this and as a consequence of the covering surface of the floor track being closed at the top, the least dangers arise for passengers and/or in regard to dirtying of the floor tracks. Since carpets are usually provided with a deep pile, which is readily deformable however, or carpeting loops, a carpet, that is directly connected to the profile of the floor track, in no way obstructs the take-up hooks 9 and 15 which readily push back the pile or, as the case may be, the carpeting loops when displacing a vehicle seat on the floor tracks.

What is claimed:

1. In a floor track assembly for mounting in a compartment of a vehicle, the assembly comprising at least two floor tracks that are mountable parallel to one another and are attachable to a floor of the vehicle; lateral supports for supporting a seat frame of a seat of the vehicle, the supports being engageable with the at least two floor tracks and being guidable in a longitudinally movable manner on the floor tracks; the floor track assembly operating to selectively displace and arrest a vehicle seat in selectable positions along the floor tracks, the improvement comprising:

the floor tracks having a T-shaped cross-sectional profile including an upper covering surface which is aligned in a plane-parallel manner relative to the floor of the vehicle;

the lateral supports each having tensile anchors which grip the T-profile of the floor tracks from below and on both sides, each of the lateral supports further including a front region and a rear region, wherein the rear region of each support is moveable between a raised and lowered position relative to the floor tracks;

the lateral supports being moveable in an upward direction from the floor tracks in such a way that the tensile anchors are placed under tension against the underside of the T-profile of the floor tracks in a tight or firm manner for the purpose of arrestment of the vehicle seat.

2. The floor track assembly in accordance with claim 1, wherein the lateral supports each have a running roller in the front region thereof which, during displacement of the seat by raising the rear region of the lateral supports, rolls on the covering surfaces of the T-profile of the floor tracks, each roller supporting a tensile anchor for engaging the underside of the T-profile of the floor track.

3. The floor track assembly in accordance with claim 1, wherein the lateral supports each have a rolling or sliding carriage in the rear region thereof that supports a tensile anchor which grips, from below, the T-profile of the floor track, wherein on displacing the seat, the carriage travels along the covering surfaces of the T-profile of the floor tracks, the rear region of the lateral support in the lowered position being arrested via the rolling or sliding carriage by means of a releasable take-up hook which is engageable with the carriage.

4. The floor track assembly in accordance with claim 2, further comprising a wedging component positioned adjacent the front running roller, between the lateral support and the floor track, wherein upon positioning of the rear region of the lateral support in the lowered position the wedging component is firmly wedged against the covering surface of the floor track, so as to firmly place the tensile anchors of the front running rollers under tension against the underside of the T-profile of the floor track for the purpose of arrestment of the vehicle seat.

5. The floor track assembly in accordance with claim 4, wherein the wedging component is an elastic block of rubber.

6. The floor track assembly in accordance with claim 2, wherein the tensile anchor is attached to an axis of the running roller.

7. The floor track assembly in accordance with claim 2, further comprising a releasable take-up hook disposed in the rear region of the lateral supports for securing the rear region of the lateral support in the lowered position for arrestment of the vehicle seat.

8. The floor track assembly in accordance with claim 1, wherein in the raised position the vehicle seat is displaceable and in the lowered position movement of the vehicle seat is arrested.

9. The floor track assembly in accordance with claim 3, further comprising a guidance lever which is connected at one end to the lateral support and is connected at its other end to the carriage in such a way that on pressing down the rear region of the lateral support in order to move the rear region into the lowered position, a pressure component of the guidance lever travels under a pressure bearing supported by the carriage so as to move the carriage off the floor track in an upward direction so that the tensile anchor supported by the carriage is placed under tension against the underside of the T-profile of the floor track.

10. The floor track assembly in accordance with claim 3, wherein the carriage includes a pair of rollers and a pair of tensile anchors.

11. The floor track assembly in accordance with claim 10, wherein the tensile anchors are connected to the axes of the rollers.

12. The floor track assembly in accordance with claim 9, wherein the other end of the guidance lever is connected to a guidance axis of the carriage.

13. The floor track assembly in accordance with claim 12, wherein the guidance axis operates as a take-up bolt for the take-up hook such that engagement of the take-up hook with the guidance axis in the lowered position releasably secures the rear region of the lateral support for arrestment of the vehicle seat.

* * * * *